US010313277B2

(12) United States Patent
Yates (10) Patent No.: US 10,313,277 B2
(45) Date of Patent: Jun. 4, 2019

(54) TIME SHIFTED COMMUNICATIONS IN NETWORKED MESSAGING SYSTEMS

(71) Applicant: Microsoft Technology Licensing, LLC, Redmond, WA (US)

(72) Inventor: Thomas Yates, Stockholm (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 203 days.

(21) Appl. No.: 15/285,101

(22) Filed: Oct. 4, 2016

(65) Prior Publication Data

US 2018/0097752 A1    Apr. 5, 2018

(51) Int. Cl.
*H04L 12/58* (2006.01)

(52) U.S. Cl.
CPC .......... *H04L 51/04* (2013.01); *H04L 51/046* (2013.01); *H04L 51/14* (2013.01); *H04L 51/20* (2013.01)

(58) Field of Classification Search
None
See application file for complete search history.

(56) References Cited

U.S. PATENT DOCUMENTS

| 7,216,146 | B2 | 5/2007 | Pous et al. |
| 7,313,229 | B1 | 12/2007 | Sherwood |
| 2004/0122900 | A1* | 6/2004 | Pous ................... G06Q 10/107 709/206 |
| 2008/0147809 | A1* | 6/2008 | Byers ..................... G06Q 30/02 709/206 |
| 2009/0055487 | A1 | 2/2009 | Moraes et al. |
| 2009/0228558 | A1 | 9/2009 | Brenner |
| 2011/0252107 | A1 | 10/2011 | Chestnut et al. |
| 2012/0110095 | A1 | 5/2012 | Kwong |
| 2013/0275516 | A1 | 10/2013 | Grant |
| 2014/0297762 | A1 | 10/2014 | Chikkanna |
| 2015/0188862 | A1 | 7/2015 | Ghafourifar et al. |
| 2016/0142355 | A1* | 5/2016 | Morten ................... H04L 51/14 709/206 |
| 2016/0191453 | A1* | 6/2016 | Thomas .................. H04W 4/12 709/206 |

FOREIGN PATENT DOCUMENTS

| EP | 1936552 A1 | 6/2008 |
| WO | 2014123927 A1 | 8/2014 |

OTHER PUBLICATIONS

"International Search Report and Written Opinion Issued in PCT Application No. PCT/US2017/054644", dated Jan. 9, 2018, 11 Pages.

(Continued)

*Primary Examiner* — Natisha D Cox (57) ABSTRACT

Systems, methods, apparatuses, and software for network messaging systems in computing environments are provided herein. In one example, a networked messaging system is provided that receives a message initiated by a sender for transfer to a recipient over the networked messaging service, and identifies a handling process for the message that includes timeshifted delivery to the recipient. The networked messaging system determines a time delay to produce the timeshifted delivery to the recipient, and transfers the message for delivery to the recipient in accordance with the time delay.

20 Claims, 5 Drawing Sheets

(56) References Cited

OTHER PUBLICATIONS

"Send email with delay in Outlook 2013", Publsihed on: Jul. 25, 2013. Available at: https://www.outlook-apps.com/send-email-delay-outlook/.

"Delivery by Time Zone", Retrieved on: Jun. 6, 2016 Available at: http://mailchimp.com/features/timewarp/.

"How to schedule a mailing for different time zones", Published on: Apr. 19, 2013 Available at: http://help.mailup.com/display/MUG/How+to+schedule+a+mailing+for+different+time+zones.

Vuillemot, et al., "Shift-Box: Inbox Time Shifting to Reduce Email Clutter", In Proceedings of Seventh annual Collaboration, Electronic messaging, Anti-Abuse and Spam Conference, Jul. 13, 2010, 4 pages.

\* cited by examiner

TIME SHIFTED COMMUNICATIONS IN NETWORKED MESSAGING SYSTEMS

TECHNICAL BACKGROUND

Networked messaging platforms have become popular for transferring communications between users, such as electronic mail (email), instant messaging, text messaging, or other messaging technologies. These messaging platforms can be provided for end users to draft or compose various messages and create conversation-threaded communications for interaction with one or more users. Users can interact with the messaging systems through graphical interfaces and user applications that are employed on smartphones, computers, laptops, tablets, gaming systems, and the like.

During typical workdays, users can send and receive many messages with other users. These users might be spread over a large geographic area, such as different countries and regions across the globe. Typical workflow for a user can include handling tasks and responding to messages, such as emails or instant messages, that are received over the course of the day. However, office workers might leave work with an empty email inbox, but arrive in the next morning with a large amount of email messages from workers in a different location or timezone. This can lead to a damaging impact on worker priorities, immediate workloads, and stress levels on individuals. Moreover, users in different time zones might transfer emails that can wake users during undesirable timeframes, such as in the middle of the night.

OVERVIEW

Systems, methods, apparatuses, and software for network messaging systems in computing environments are provided herein. In one example, a networked messaging system is provided that receives a message initiated by a sender for transfer to a recipient over the networked messaging service, and identifies a handling process for the message that includes timeshifted delivery to the recipient. The networked messaging system determines a time delay to produce the timeshifted delivery to the recipient, and transfers the message for delivery to the recipient in accordance with the time delay.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Networked messaging platforms, such as electronic mail (email) systems, instant messaging platforms, text messaging, or other messaging technologies, allow one or more users to compose various messages and communications for interaction with one or more users. During workdays, users can send and receive many messages with other users that might be spread over a large geographic area, such as different countries and regions across the globe. Typical workflow for a user can include handling tasks and responding to messages, such as emails or instant messages, that are received over the course of the day. However, office workers might leave work with an organized or empty email inbox, but arrive in the next morning with a large amount of email messages from workers in a different location or timezone. This can lead to a damaging impact on worker priorities, immediate workloads, and stress levels on individuals. Moreover, users in different time zones might transfer instant messages that are delivered at inconvenient times, such as at night or after a workday has ended.

The examples herein provide enhanced handling and operation for transfer of messages among users. These messages can include email, instant messages, text messages, chat messages, or other messages, including combinations thereof. The enhanced operations include establishing time differentials among senders and recipients of messages and delivering messages according to a local time property, such as time zone, of the recipient. This advantageously allows a recipient to receive messages in due course over workday timeframes associated with the recipient instead of according to workday timeframes associated with the sender. Technical effects include increased user productivity and more efficient usage of local computing systems and processing resources. Further technical effects can include decreased usage of communication networks during peak hours on sender-side networks and timeshifting of message delivery across networks associated with recipients to a time which recipient devices are typically powered on and active, which can lead to enhanced scheduling of network resources according to active workdays of users.

Figure 1:
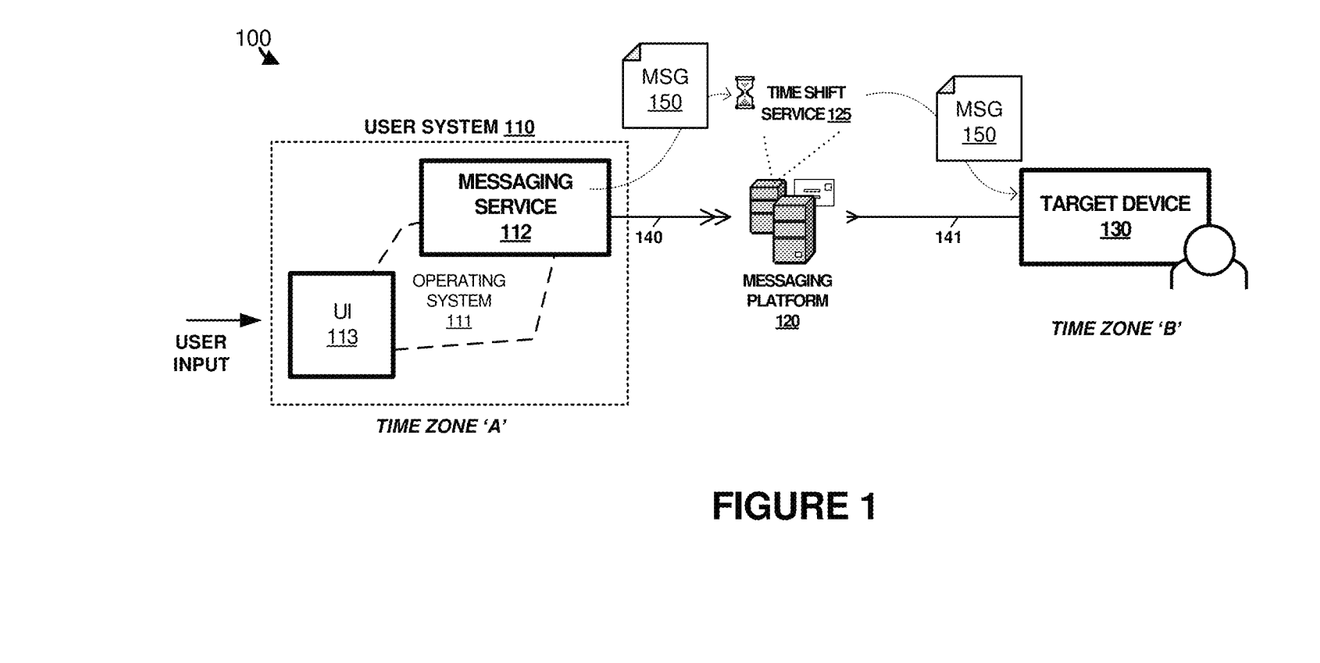
FIG. 1 illustrates a messaging environment in an implementation.

As a first example of enhanced network messaging, FIG. 1 is presented. FIG. 1 is a system diagram that includes network messaging environment 100. Environment 100 includes user system 110, messaging platform 120, and target device 130. User system 110 and messaging platform 120 communicate over link 140. Target device 130 and messaging platform 120 communicate over link 141. Messaging platform 120 includes timeshift service 125. User system 110 includes operating system 111, messaging service 112, and user interface 113.

In FIG. 1, user system 110 is located in a first geographic location associated with a first time zone, while target device 130 is located in a second geographic location associated with a second time zone different than the first time zone. It should be understood that actual hardware or devices might not be located in each geographic location, and instead associated users might be located in the respective geographic locations with the users accessing messaging features of messaging platforms over centralized or distributed computing interfaces, web interfaces, virtualized interfaces, or other interfaces, including combinations thereof.

In operation, a user of user system 110 can compose messages, such as message 150, for delivery to various recipients, such as a recipient associated with target device 130. These messages can include emails, instant messages, or other messages, and can also include various attachments, links, digital files, or other information. Typically, the sender associated with user system 110 will send these messages during the course of a workday of the sender, such as from the hours of 8 am to 5 pm in a local time zone of the sender. However, in email or messaging systems, delivery of the messages quickly and with minimized latency is preferred. This preference can lead to fast or 'instant' delivery of the messages transferred by the sender to the various recipients. However, the various recipients might be located in different time zones than the sender, and thus might receive the messages transferred by the sender at inconvenient times or during a timeframe where the recipients are absent from a workplace or office. Moreover, when these recipients being a subsequent workday, messages from many different senders across many different locations might have been delivered in the absence of the recipient, during a time when the recipient does not check for new messages, or during a time of day when the recipient does not want to be disturbed with such messages.

Advantageously, in FIG. 1, timeshift service 125 establishes a time differential between a sender and recipient so that workdays or other productive timeframes are synchronized according to a local time zone property of each party. Messaging platform 120 can deliver messages to recipients according to the time differentials established by timeshift service 125.

Figure 2:
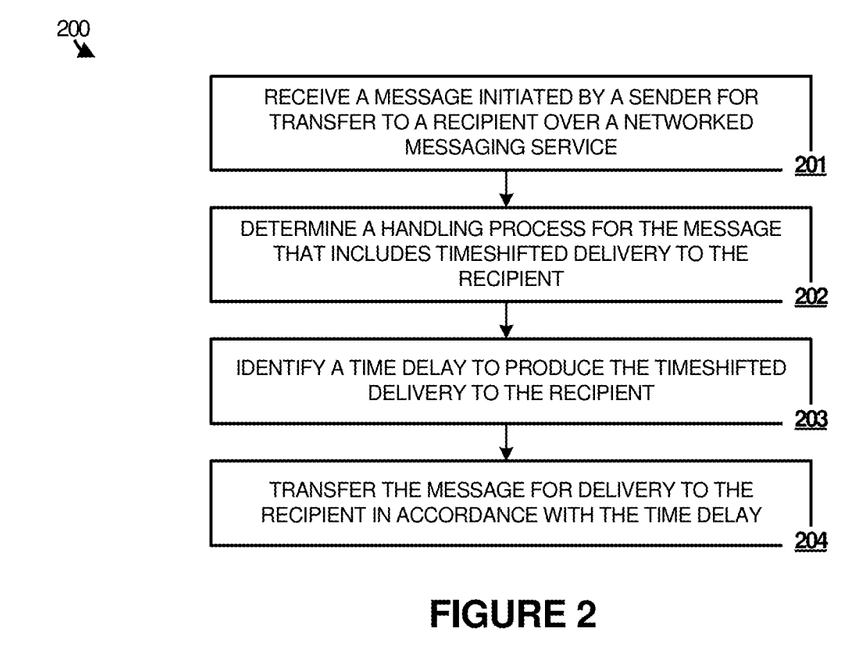
FIG. 2 illustrates a message timeshifting process in an implementation.

As a further example of the operation of FIG. 1, FIG. 2 is presented. In FIG. 2, messaging platform 120 receives (201) a message initiated by a sender for transfer to a recipient over a networked messaging service. The networked messaging service can include elements of messaging platform 120, along with end-user interfaces which can include messaging service 112, user applications, web interfaces, terminal interfaces, and the like. A distributed or centralized messaging platform can be employed, such as in FIG. 1. However, the operations described herein can also apply to peer-to-peer messaging systems as will be discussed below.

The message can be composed by a user of user system 110, such as within a message composition element of user interface (UI) 113 executed in the framework of operating system 111 and messaging service 112. The message can include one or more recipients that are indicated by the sender, and can include threaded conversations or subject line-organized messaging. Both email messages and instant messages, among others, can be composed by the sender.

Once the message has been composed, the sender can indicate that the message is to be delivered, such as by selecting a 'send' button or other user interface element. However, in this example, a timeshift process is employed to provide timeshifted delivery to the recipients. The timeshift process can be indicated by the sender. The sender can select a timeshift indication element in the user interface that indicates the sender prefers to use a timeshifted delivery. Other actions can be used to indicate the timeshifted delivery, among user interface elements, configuration settings, menu selections, dialog boxes, and the like.

Responsive to receiving the message to be delivered with timeshifting, messaging platform 120 determines (202) a handling process for the message that includes timeshifted delivery to the recipient. In this example, timeshift service 125 can be employed by messaging platform 120 to perform the various timeshift operations, although further elements can be employed. The handling process is determined to include a timeshift delivery, among other handling options including delivery network, network addresses, delivery to recipient server or services, a holding or storage location for any pending messages during the timeshift period, among other handling processes.

The timeshift can include identifying (203) a time delay to produce the timeshifted delivery to the recipient. The time delay corresponds to a difference in time of receipt of the message into messaging platform 120 from the sender and a time of delivery to a recipient from messaging platform 120. When peer-to-peer messaging platforms are employed, the time delay can include either a delay to transfer the message from the sender or a delay to alert the recipient of the message already delivered by hidden, among other operations. When multiple recipients are indicated by the sender or associated with the message, then multiple time delays can be determined—with associated time delays determined for each recipient.

To determine the time delays, various processes can be employed. In a first example, a time zone differential is determined between the sender and the recipient. This time zone differential can be determined by processing a time zone associated with the sender against a time zone associated with the recipient. Conversion of associated local times to a common time indication can be employed, such as Coordinated Universal Time (UTC) or other common time indications.

In other examples, local time zones of the sender and recipient might be considered along with workday schedules of the associated parties. For example, the sender might have a workday schedule indicated as 9 am-5 pm in a local time zone of the sender, and the recipient might have a workday schedule indicated as 10 am-6 pm in that local time zone. Working days and weekends or vacation days can also be considered to establish the time delay.

Synchronization of workday schedules can be achieved by establishing the time delay to deliver messages at a timeframe approximately similar with respect to workdays of the sender and recipient. For example, if the sender composes a message and then initiates transfer of the message at 9 am in a time zone of the sender, timeshift service 125 can determine a relative time within a workday and time zone of the recipient for delivery of the message. Specifically, timeshift service 125 might deliver the message at 9 am in the time zone of the recipient. In further examples, differences in relative workdays among the parties can be considered. For example, the recipient might have a workday schedule of 8 am-5 pm and the sender might have a workday of 9 am-6 pm. A message transferred by the sender at 11 am in the time zone of the sender can be offset by an additional hour to compensate for the differences in workday schedule of the respective parties, and thus be delivered at 10 am in a local time zone of the recipient. Other considerations are possible in time delays, time differentials, and relative workday/schedule offsets.

Thus, using one or more of the timeshift processes discussed above, message platform 120 transfers (204) the message for delivery to the recipient in accordance with the time delay. For example, message platform 120 might cache or otherwise buffer message 150 after receiving message 150 from user system 110. Message platform 120 can include one or more storage devices for caching messages until a proper delivery time, such as according to the timeshift processes herein. Delivery of the messages is withheld or delayed until a delivery time has been reached. Once a delivery time has been reached, then delivery of the message can occur to the one or more recipients. In peer-to-peer examples, one of the 'peers' or endpoints might include this timeshift function and caching feature to ensure delivery to the recipient according to the time delay. Alternatively, a sender might transfer the message for delivery to the recipient immediately but the target device can buffer the message and withhold alerting a recipient of the message receipt until expiration of the time delay. Other peer-to-peer examples are possible, including having third-parties cache and timeshift the message delivery on behalf of the sender or recipient.

Returning to a discussion of the elements of FIG. 1, user system 110 and target device 130 each comprise any number of end user systems, such as terminals, computing devices, tablet devices, smartphones, personal computers, servers, cloud-based systems, distributed computing platforms, and the like. Users, such as users of a communication platform or other personnel, can compose, transfer, and receive messages, such as email and instant messages. user system 110 and target device 130 each include one or more network interfaces, such as network interface cards, wireless interfaces, optical networking interfaces, and the like, over which search requests and communication sessions can be initiated. user system 110 and target device 130 each can include hardware and software elements to interface with a certificate platform using web interfaces, terminal interfaces, console interfaces, shell interfaces, APIs, graphical user interface, textual user interface, among other user interfaces, including combinations thereof.

Operating system 111 comprises one or more execution elements which provide an execution platform between user-facing applications and input devices and associated execution hardware. In many examples, operating system 111 comprises a multitasking or multithreaded operating environment for user applications, such as messaging service 112, among other applications or services, and also provides logical access to user interface 113 and various hardware elements, such as displays, user input devices, multimedia devices, and the like. Operating system 111 allows execution of messaging service 113 and UI 113 on associated processing systems and memory devices.

User interface (UI) 113 comprises one or more graphical or textual user interface elements which are presented to a user of implementation 100 for interacting with the elements of messaging service 112, among other applications and services. UI 113 can comprise many graphical layers or graphical elements which are superimposed and correlated to render an interactive windowed or tablet interface to a user, such as over one or more display screens. UI 113 can also include various audio output elements for indicating audible user interface elements to a user. UI 113 receives user input from various input devices, such as a keyboard, mouse, touch screen, touch panel, gaming controller, or other user input devices which can be used in combination with such as mouse input, keyboard input, voice input, visual input, or other user input methods. This user input can be detected by UI 113 and translated into actions which can be interpreted by further elements of implementation 100, such as operating system 111 or messaging service 112.

Messaging service 112 comprises user applications, such as a messaging application, content editing application, productivity application, gaming application, or communication application. Messaging service 112 presents one or more user interface elements, such as those rendered using UI 113, to allow a user to interact with messaging service 112. For example, in messaging service 112, messages can be received over one or more network interface, displayed to a user via US 113, and a user can view messages, edit and compose messages, and edit any attachments. Messaging service 112 can comprise logical interface elements, such as software defined interfaces and Application Programming Interfaces (APIs).

Messaging platform 120 includes timeshift service 125, among other elements. Messaging platform 120 comprises server based or distributed computing based messaging services and platforms, such as email messaging platforms, chat platforms, or instant messaging platforms, among others. Messaging platform 120 can include communication interfaces, network interfaces, processing systems, computer systems, microprocessors, storage systems, storage media, or some other processing devices or software systems, and can be distributed among multiple devices or across multiple geographic locations. Examples of messaging platform 120 can include software such as an operating system, logs, databases, utilities, drivers, networking software, and other software stored on a computer-readable medium. Messaging platform 120 can comprise one or more platforms which are hosted by a distributed computing system or cloud-computing service. Messaging platform 120 can comprise logical interface elements, such as software defined interfaces and Application Programming Interfaces (APIs). Messaging platform 120 can include one or more user interfaces, such as graphical user interfaces, web interfaces, APIs, terminal interfaces, console interfaces, command-line shell interfaces, extensible markup language (XML) interfaces, among others.

Links 140-141 can each comprise one or more communication links, such as one or more network links comprising wireless or wired network links. Links 140-141 can comprise various logical, physical, or application programming interfaces. Example communication links can use metal, glass, optical, air, space, or some other material as the transport media. Links 140-141 can use various communication protocols, such as Internet Protocol (IP), Ethernet, hybrid fiber-coax (HFC), synchronous optical networking (SONET), asynchronous transfer mode (ATM), Time Division Multiplex (TDM), circuit-switched, communication signaling, wireless communications, or some other communication format, including combinations, improvements, or variations thereof. Links 140-141 can include direct links or may include intermediate networks, systems, or devices, and can include a logical network link transported over multiple physical links. Links 140-141 can include routers, switches, bridges, traffic handling nodes, and the like for transporting traffic among endpoints.

Figure 3:
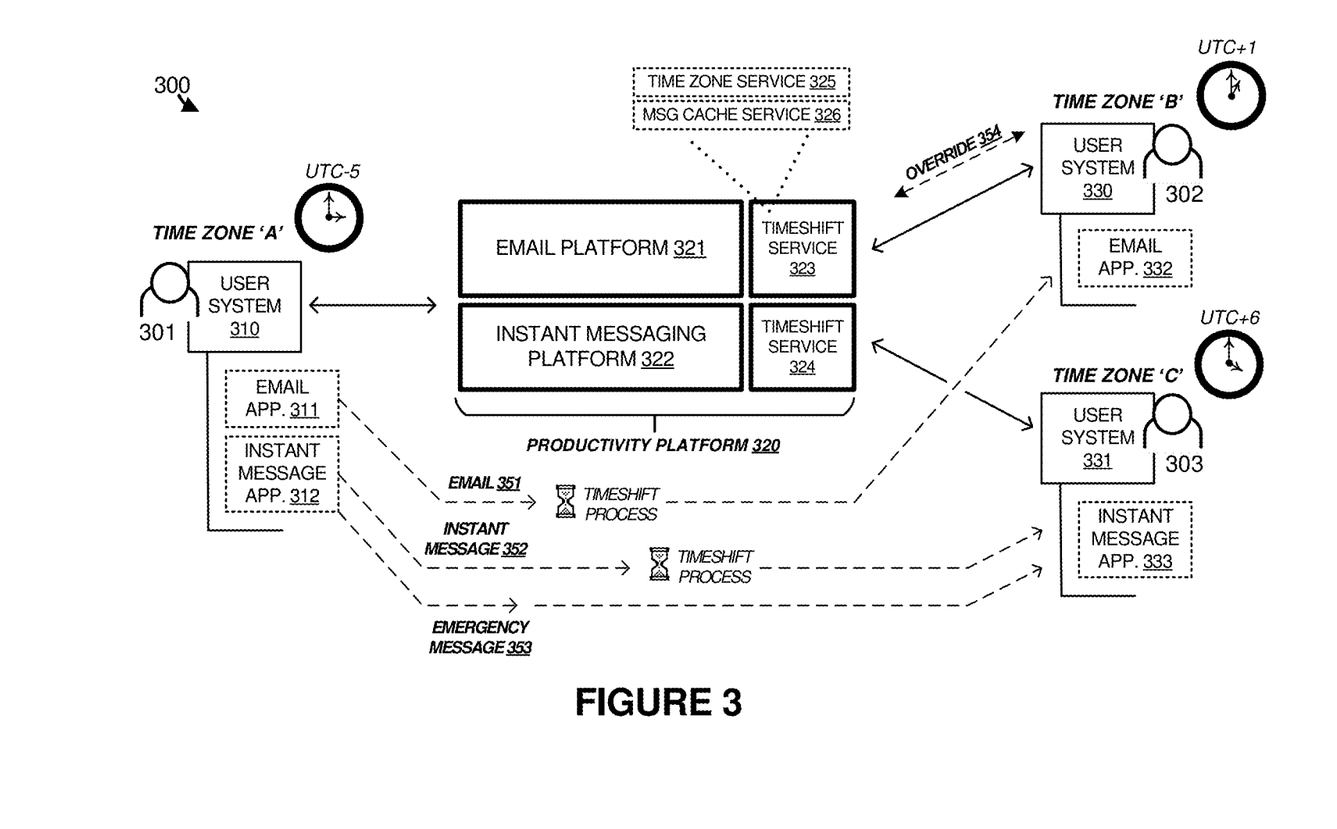
FIG. 3 illustrates a messaging environment in an implementation.

As a further example of timeshifted delivery of messages, FIG. 3 is presented. FIG. 3 illustrates messaging environment 300 that provides for messaging features between various users and user systems over email and instant messaging platforms. Specifically, environment 300 includes user system 310, productivity platform 320, and user systems 330-331. In operation, users can compose and transfer messages for delivery to other users over productivity platform 320. Productivity platform 320 includes timeshifting features to allow for time delayed transfer of these messages among the users.

Productivity platform 320 includes one or more messaging services/platforms, with each having an associated timeshift service. Productivity platform 320 includes email platform 321 with associated timeshift service 323. Productivity platform 320 includes instant messaging platform 322 with associated timeshift service 324. Email platform 321 and instant messaging platform 322 both provide platforms for users to compose and send messages to other users, such as over API interfaces, web interfaces, distributed computing interfaces or other interfaces, including any associated networks and links. Email platform 321 provides electronic mail services, such as message composition, address book features, attachment delivery, mailbox storage, and other features. Instant messaging service 322 provides instant messaging services, such as text messaging, chat, and threaded conversation features. Although email platform 321 and instant messaging platform 322 can share similar features, typically these types of messaging systems include different use cases and historical distinctions. Moreover, email typically includes discrete messages transferred among users, while instant messaging typically includes relatively real-time text chat among members.

In FIG. 3, three users are shown. A first user 301 is in time zone 'A' which corresponds to UTC−5. A second user 302 is in time zone 'B' which corresponds to UTC+1. A third user 303 is in time zone 'C' which corresponds to UTC+6. Thus, a time differential between user 301 and 302 is 6 hours, while a time differential between user 301 and 303 is 11 hours. Each user might have different workday schedules and associated active hours. In the example in FIG. 3, time zones are considered. However, it should be understood that adjustments to the time differentials can be made according to individual active hours or workday schedules, as described above.

To determine the time delays based on relative time zone differentials or upon active hours/workday schedules, time zone service 325 can track time properties of individual users or determine delays on-the-fly according to properties of the users. Determining these properties can include correlating network addresses to geographic locations and time zones, interpreting properties of the messages, such as metadata, to determine associated time zones or geographic locations, identifying user-specified time or location properties, identifying time properties from user profiles, or other determinations. Time zone service 325 can persist the time properties of users for use in delivery of many messages. Instant messaging platform 322 can also include time zone services that determine and store time properties of users.

Each user system 310 and 330-331 includes one or more associated applications for engaging in messaging operations. Specifically, user system 310 includes email application 311 and instant messaging application 312, user system 330 includes email application 332, and user system 331 includes instant messaging application 333. These associated applications provide a user interface and locally executed portions of the productivity platform. In some examples, the associated applications comprise web browser interfaces, full applications, mobile apps, among other operational implementations.

During operation, each of the users can transfer messages for delivery to each other, among other users. In this example, messages transferred by user system 310 will be focused upon for clarity. In a first example message, email message 351 is composed and transferred for delivery to user 302. The sender, user 301, indicates that a timeshifted delivery is to be employed for message 351, and message 351 is cached for timeshifted delivery upon receipt of the message into email platform 321. Timeshift service 323 employs message cache service 326 to store or buffer the transferred messages before delivery to the recipient party. Once a corresponding time delay has been reached, timeshift service 323 can indicate to email platform 321 to deliver message 351 to user 302. In a second example, instant message 352 is composed and transferred for delivery to user 303. The sender, user 301, indicates that a timeshifted delivery is to be employed for message 352, and message 352 is cached for timeshifted delivery upon receipt of the message into instant messaging platform 322. Timeshift service 324 employs a similar message cache service as timeshift service 323 to store or buffer the transferred instant message until delivery to the recipient party. Once a corresponding time delay has been reached, timeshift service 324 can indicate to instant messaging platform 322 to delivery message 352 to user 303. In a third example, a non-timeshifted message is employed, namely emergency message 353. User 301 can indicate that no timeshifting is to be employed for message 353, or a default behavior can result in an instant or immediate transfer of the message to the recipient(s).

In addition to non-timeshifted emergency messages, the users might elect to override an active timeshift process. For example, several messages might be in a queue or cache awaiting delivery according to a timeshift process. An affected user, such as a recipient, can elect to have all pending messages delivered immediately. The user might select a user interface element, such as an override button or other interface element. In FIG. 3, override 354 indicates that user 302 elected to have all messages, or a specified portion thereof, delivered without the timeshift processes. These messages might be stored by cache service 326 or a cache service associated with instant messaging platform 322. In another example, a user might desire to have all messages that have been queued or cached to be delivered at a specified time during the day. The user can specify a delivery time and all cached/delayed messages, or an indicated portion thereof, can be responsively delivered.

Further timeshifting processes can still be active when a user selects that pending messages be delivered. Threaded conversations can be distinct among the timeshifting or override features, so that certain conversation threads might not have timeshifting applied, while others might have timeshifting applied. This can be useful when a user is engaged in a conversation that might have obsolete messages and the user wants to have all messages for a conversation thread transferred without delay, or to engage in real-time conversations for only particular messaging threads. Threads can be distinguished by user input, subject line, or embedded metadata, among other distinctions. Users can select messages for particular threads, such as graphical buttons, right-click contextual menus, or other user interface elements to specify timeshifting or real-time delivery, among other options, for various conversation threads.

Figure 4:
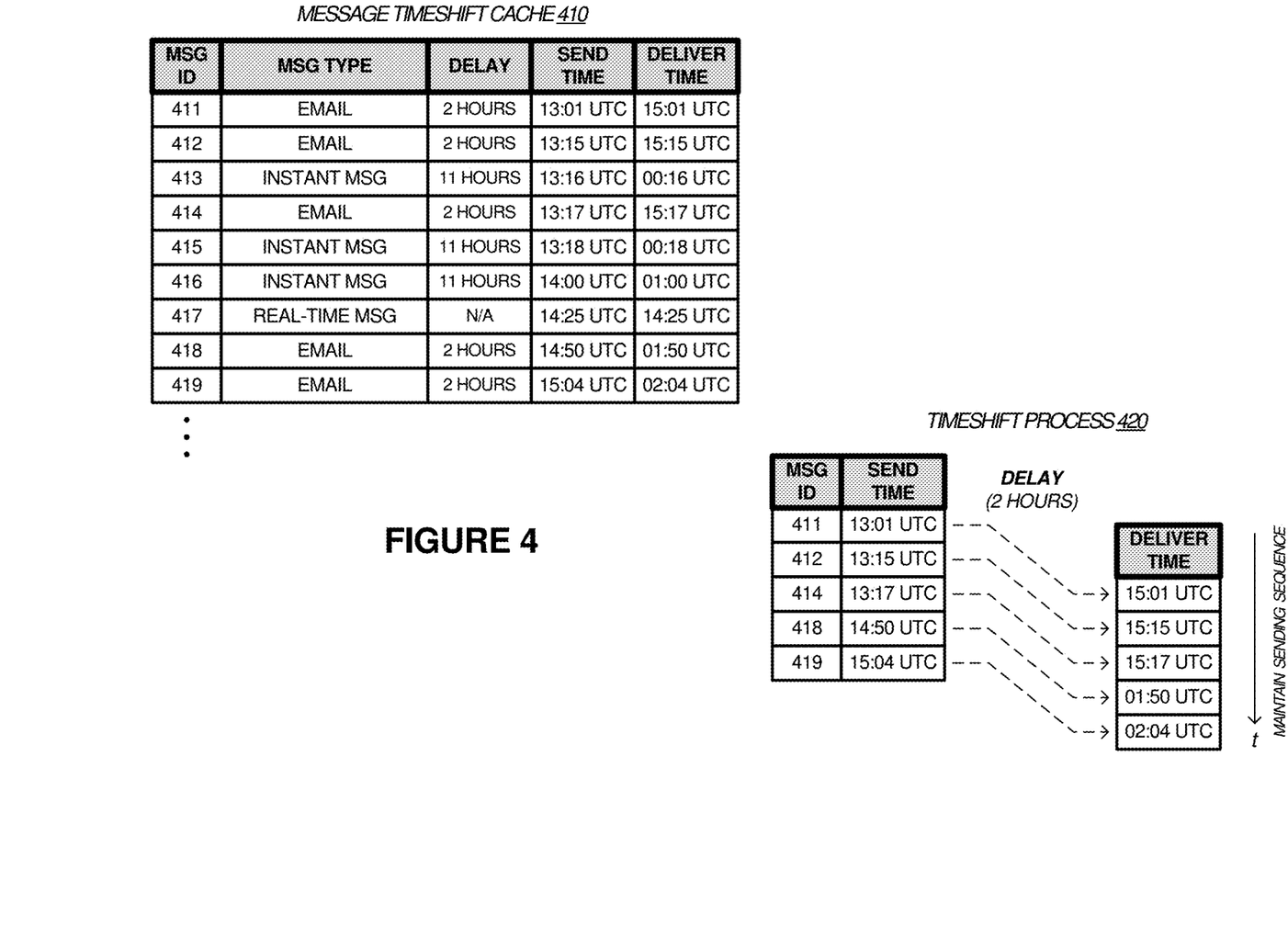
FIG. 4 illustrates a message timeshifting process in an implementation.

As a further example of the buffered or stored messages that are pending delivery upon expiration of a time delay, FIG. 4 is presented. FIG. 4 includes message timeshift cache 410 which includes a number of messages pending delivery. These messages 411-419 can be of various types or forms, and can include email, instant messages, and messages that are not to be timeshifted, e.g. real-time message 417. A common data structure or cache can be used to store both timeshifted messages and non-timeshifted messages, as indicated by message 417. A time delay is indicated in table 410 for each message, and this time delay is calculated based on a time zone differential between a sender time and a recipient time. Thus, two columns in table 410 indicate a send time and a delivery time which incorporates any appropriate time delays.

Timeshift process 420 in FIG. 4 is included to show an additional example of the timeshifting processes described herein. For example, messages for delivery to a particular user or party are extracted from table 410 to emphasize features of the timeshifting. Each individual message includes an associated time delay to ensure that delivery is performed according to the relative difference in time zone. This establishes a rolling timeshifted synchronization among two or more users. The rolling timeshift provides for delivery or alerting of messages to a recipient that maintains an original ordering of message transfer from a sender and shifted according to a time zone, workday schedule, or active hours of the various parties involved. Advantageously, a recipient party can receive messages throughout a workday as if the messages were sent by the sender at corresponding times local to the recipient, even though the sender transferred the messages at corresponding times local to the sender.

Figure 5:
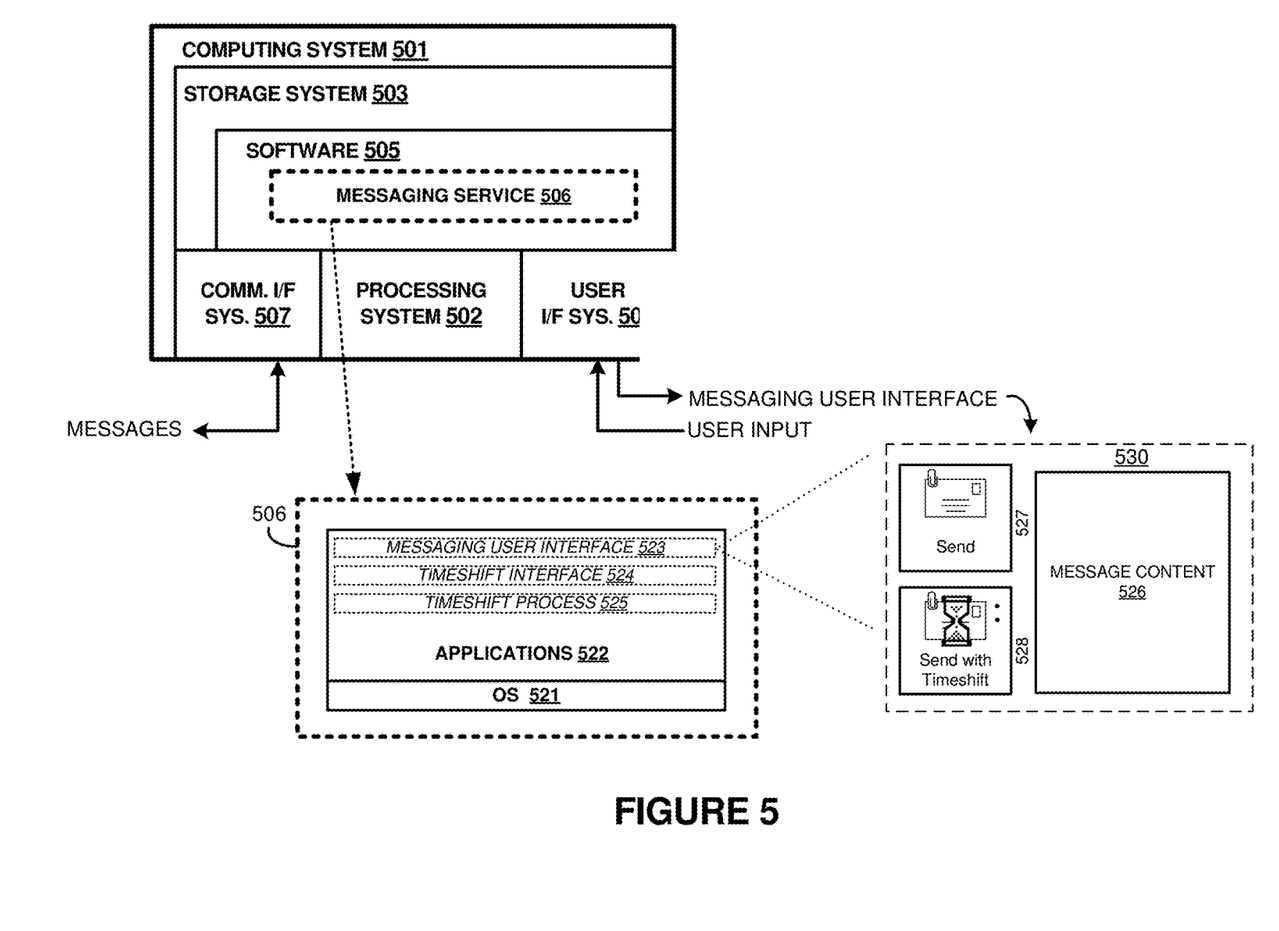
FIG. 5 illustrates a computing system suitable for implementing any of the architectures, processes, and operational scenarios disclosed herein.

FIG. 5 illustrates computing system 501 that is representative of any system or collection of systems in which the various operational architectures, scenarios, and processes disclosed herein may be implemented. For example, computing system 501 can be used to implement any of the elements of FIG. 1, such as messaging service 112 or messaging platform 120 of FIG. 1, and productivity platform 320 of FIG. 3 or any of the user systems of FIG. 3.

Examples implemented by computing system 501 include, but are not limited to, server computers, cloud computing systems, distributed computing systems, software-defined networking systems, computers, desktop computers, hybrid computers, rack servers, web servers, cloud computing platforms, and data center equipment, as well as any other type of physical or virtual server machine, and other computing systems and devices, as well as any variation or combination thereof. When portions of computing system 501 are implemented on user devices, example devices include smartphones, laptop computers, tablet computers, desktop computers, gaming systems, entertainment systems, and the like.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 508. Processing system 502 is operatively coupled with storage system 503, communication interface system 507, and user interface system 508.

Processing system 502 loads and executes software 505 from storage system 503. Software 505 includes messaging service 506, which is representative of the processes, services, and platforms discussed with respect to the preceding Figures.

When executed by processing system 502 to provide enhanced messaging services, including timeshifted message delivery, among other services, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and processing circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced messaging services, including timeshifted message delivery, among other services.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software or other application software, in addition to or that include messaging service 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to provide enhanced messaging services, including timeshifted message delivery, among other services. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Messaging service 506 includes one or more software elements, such as OS 521 and applications 522. Applications 522 can receive user input, such as message composition requests and message send requests from users, through user interface system 508. Applications 522 can include messaging user interface 523, timeshift interface 524, and timeshift process 525, or other services which can provide enhanced messaging services, including timeshifted message delivery. These elements can describe various portions of computing system 501 with which a user interacts. For example, OS 521 can provide a software platform on which user application is executed and allows for receipt and monitoring of input from user interface system 508 and delivery of messages and other content over communication interfaces.

User applications 522 can be any application discussed herein, such as productivity, messaging, electronic mail, instant messaging, network chat, network messaging, editors, word processors, spreadsheets, or applications, and includes user interface elements which can be manipulated by a user. In one example, messaging user interface 523 includes graphical user interface 530 that further includes message content view 526, message send user interface element 527, and message timeshift send user interface element 528. Messaging user interface 523 handles receipt and transfer of messages and attachments. Messaging user interface 523 can present composition user interface views as well as received messages and attachments to users, such as through user interface system 508. When a user desires to send a message that is composed using messaging user interface 523, the user can select to send immediately or to send with a timeshift, as indicated by elements 527 and 528, respectively. Message content 526 can comprise a message editor and include several user interface elements, which can comprise command line, graphical, or web-based user interface elements, among others.

Timeshift interface 524 can provide user interface elements to receive indications of timeshift processes from users, such as allowing a user to manually enter time delays or to automatically detect time delays between sender and recipients. In some examples, timeshift interface 524 is incorporated into user interface elements presented by messaging user interface 523, such as element 528. Timeshift process 525 can delay transfer of messages according to a time delay or other delay. Timeshift process 525 can identify a time delay entered by a user or automatically according to properties of the sender and recipient entities. In some examples, timeshift process 525 can include a message cache that holds messages until a time delay is reached.

Communication interface system 507 may include communication connections and devices that allow for communication with other computing systems (not shown) over communication networks (not shown). Examples of connections and devices that together allow for inter-system communication may include network interfaces, network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

User interface system 508 can receive input and provide output over a network interface, such as communication interface system 507. In network examples, user interface system 508 might include web interfaces and terminal interfaces. User interface system 508 can packetize display or graphics data for remote display by a display system or computing system coupled over one or more network interfaces or web interfaces. Physical or logical elements of user interface system 508 can provide alerts or visual outputs to users or other operators. User interface system 508 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface. In further examples, user interface system 508 may include a touchscreen, keyboard, mouse, voice input device, audio input device, or other touch input device for receiving input from a user. Output devices such as a display, speakers, web interfaces, terminal interfaces, and other types of output devices may also be included in user interface system 508.

Communication between computing system 501 and other computing systems, may occur over a communication network or networks and in accordance with various communication protocols, combinations of protocols, or variations thereof. Examples network include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Certain inventive aspects may be appreciated from the foregoing disclosure, of which the following are various examples.

EXAMPLE 1

A computing apparatus comprising one or more computer readable storage media, a processing system operatively coupled with the one or more computer readable storage media, and program instructions stored on the one or more computer readable storage media comprising a networked messaging service. The networked messaging service, when executed by the processing system, directs the processing system to at least receive a message initiated by a sender for transfer to a recipient over the networked messaging service, identify a handling process for the message that includes timeshifted delivery to the recipient, determine a time delay to produce the timeshifted delivery to the recipient, and transfer the message for delivery to the recipient in accordance with the time delay.

EXAMPLE 2

The computing apparatus of Example 1, comprising further program instructions, when executed by the processing system, direct the processing system to at least determine the time delay to produce the timeshifted delivery by at least determining a first time zone associated with the sender and a second time zone associated with the recipient and establishing the time delay based on a time differential between the first time zone and the second time zone.

EXAMPLE 3

The computing apparatus of Examples 1-2, comprising further program instructions, when executed by the processing system, direct the processing system to at least withhold the message from delivery to the recipient until expiration of the time delay to transfer the message for delivery to the recipient in accordance with the time delay.

EXAMPLE 4

The computing apparatus of Examples 1-3, where the handling process for the message comprises a message delivery delay corresponding to the time delay.

EXAMPLE 5

The computing apparatus of Examples 1-4, comprising further program instructions, when executed by the processing system, direct the processing system to at least identify the handling process as including the timeshifted delivery for the message by receiving an indication from the sender to produce the timeshifted delivery.

EXAMPLE 6

The computing apparatus of Examples 1-5, comprising further program instructions, when executed by the processing system, direct the processing system to at least receive the indication to produce the timeshifted delivery from a user interface element presented to the sender.

EXAMPLE 7

The computing apparatus of Examples 1-6, where delivery of the message is delayed by at least the time delay to synchronize work schedules of the sender and the recipient.

EXAMPLE 8

The computing apparatus of Examples 1-7, where the time delay corresponds to a difference between a work schedule indicated for the sender and a work schedule indicated for the recipient to produce delivery of the message at a time in the work schedule of the recipient that corresponds to a time in the work schedule of the sender.

EXAMPLE 9

The computing apparatus of Examples 1-8, where the message comprises one of an electronic mail message and an instant message.

EXAMPLE 10

A method of operating a networked messaging system, the method comprising receiving a message initiated by a sender for transfer to a recipient over the networked messaging service, identifying a handling process for the message that includes timeshifted delivery to the recipient based at least on a time zone of the recipient, determining a time delay to produce the timeshifted delivery to the recipient, and transferring the message for delivery to the recipient in accordance with the time delay.

EXAMPLE 11

The method of Example 10, further comprising determining the time delay to produce the timeshifted delivery by at least determining a first time zone associated with the sender and a second time zone associated with the recipient and establishing the time delay based on a time differential between the first time zone and the second time zone.

EXAMPLE 12

The method of Examples 10-11, further comprising withholding the message from delivery to the recipient until expiration of the time delay to transfer the message for delivery to the recipient in accordance with the time delay.

EXAMPLE 13

The method of Examples 10-12, where the handling process for the message comprises a message delivery delay corresponding to the time delay.

EXAMPLE 14

The method of Examples 10-13, further comprising identifying the handling process as including the timeshifted delivery for the message by receiving an indication from the sender to produce the timeshifted delivery.

EXAMPLE 15

The method of Examples 10-14, further comprising receiving the indication to produce the timeshifted delivery from a user interface element presented to the sender.

EXAMPLE 16

The method of Examples 10-15, where delivery of the message is delayed by at least the time delay to synchronize work schedules of the sender and the recipient.

EXAMPLE 17

The method of Examples 10-16, where the time delay corresponds to a difference between a work schedule indicated for the sender and a work schedule indicated for the recipient to produce delivery of the message at a time in the work schedule of the recipient that corresponds to a time in the work schedule of the sender.

EXAMPLE 18

The method of Examples 10-17, where the message comprises one of an electronic mail message and an instant message.

EXAMPLE 19

A computing apparatus comprising one or more computer readable storage media a processing system operatively coupled with the one or more computer readable storage media, and program instructions stored on the one or more computer readable storage media comprising a messaging application. The messaging application, when executed by the processing system, directs the processing system to at least present a user interface comprising a message composition view having a workday synchronization indication element, receive a message composed by a sender through the message composition view for delivery to a recipient, receive a workday synchronization designation through the workday synchronization indication element that indicates a timeshifted delivery for delivery of the message to the recipient, determine a time delay to produce the timeshifted delivery to the recipient, and withhold transfer the message for delivery to the recipient in accordance with the time delay.

EXAMPLE 20

The computing apparatus of Example 19, comprising further program instructions, when executed by the processing system, direct the processing system to at least determine the time delay to produce the timeshifted delivery by at least determining a first time zone associated with the sender and a second time zone associated with the recipient and establishing the time delay based on a time differential between the first time zone and the second time zone.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A computing apparatus comprising:
one or more computer readable storage media;
a processing system operatively coupled with the one or more computer readable storage media; and
program instructions stored on the one or more computer readable storage media comprising a networked messaging service, wherein the networked messaging service, when executed by the processing system, directs the processing system to at least:
receive a message initiated by a sender for transfer to a recipient over the networked messaging service;
determine a handling process for delivery of the message to the recipient to produce timeshifted delivery having a time delay corresponding to at least a relative time difference within a schedule of a workday between the sender and the recipient; and
transfer the message for delivery to the recipient in accordance with the time delay.

2. The computing apparatus of claim 1, comprising further program instructions, when executed by the processing system, direct the processing system to at least:
determine the time delay to produce the timeshifted delivery by at least determining a first time zone associated with the sender and a second time zone associated with the recipient and establishing the time delay based at least on a time differential between the first time zone and the second time zone.

3. The computing apparatus of claim 1, comprising further program instructions, when executed by the processing system, direct the processing system to at least:
withhold the message from delivery to the recipient until expiration of the time delay to transfer the message for delivery to the recipient in accordance with the time delay.

4. The computing apparatus of claim 1, wherein the handling process for the message comprises a message delivery delay corresponding to the time delay.

5. The computing apparatus of claim 1, comprising further program instructions, when executed by the processing system, direct the processing system to at least:
identify the handling process as including the timeshifted delivery for the message by receiving an indication from the sender to produce the timeshifted delivery.

6. The computing apparatus of claim 5, comprising further program instructions, when executed by the processing system, direct the processing system to at least:
receive the indication to produce the timeshifted delivery from a user interface element presented to the sender.

7. The computing apparatus of claim 1, wherein delivery of the message is delayed by at least the time delay to synchronize work schedules within the workday of the sender and the recipient.

8. The computing apparatus of claim 1, wherein the time delay corresponds to a difference between work schedule hours indicated for the sender and work schedule hours indicated for the recipient to produce delivery of the message at a time in the work schedule of the recipient that corresponds to a relative time in the work schedule of the sender.

9. The computing apparatus of claim 1, wherein the message comprises one of an electronic mail message and an instant message.

10. A method of operating a networked messaging system, the method comprising:
receiving a message initiated by a sender for transfer to a recipient over the networked messaging service;
identifying a handling process for the message that includes timeshifted delivery to the recipient based at least on a time zone of the recipient;
determining a time delay to produce the timeshifted delivery to the recipient, wherein the time delay corresponds to at least a relative time difference within a schedule of a workday between the sender and the recipient; and
transferring the message for delivery to the recipient in accordance with the time delay.

11. The method of claim 10, further comprising:
determining the time delay to produce the timeshifted delivery by at least determining a first time zone associated with the sender and a second time zone associated with the recipient and establishing the time delay based at least on a time differential between the first time zone and the second time zone.

12. The method of claim 10, further comprising:
withholding the message from delivery to the recipient until expiration of the time delay to transfer the message for delivery to the recipient in accordance with the time delay.

13. The method of claim 10, wherein the handling process for the message comprises a message delivery delay corresponding to the time delay.

14. The method of claim 10, further comprising:
identifying the handling process as including the timeshifted delivery for the message by receiving an indication from the sender to produce the timeshifted delivery.

15. The method of claim 14, further comprising:
receiving the indication to produce the timeshifted delivery from a user interface element presented to the sender.

16. The method of claim 10, wherein delivery of the message is delayed by at least the time delay to synchronize work schedules within the workday of the sender and the recipient.

17. The method of claim 10, wherein the time delay corresponds to a difference between a work schedule indicated for the sender and work schedule hours indicated for the recipient to produce delivery of the message at a time in work schedule hours of the recipient that corresponds to a relative time in the work schedule of the sender.

18. The method of claim 10, wherein the message comprises one of an electronic mail message and an instant message.

19. A computing apparatus comprising:
one or more computer readable storage media;
a processing system operatively coupled with the one or more computer readable storage media; and
program instructions stored on the one or more computer readable storage media comprising a messaging application, wherein the messaging application, when executed by the processing system, directs the processing system to at least:
present a user interface comprising a message composition view having a workday synchronization indication element;
receive a message composed by a sender through the message composition view for delivery to a recipient;
receive a workday synchronization designation through the workday synchronization indication element that indicates a timeshifted delivery for delivery of the message to the recipient;
determine a time delay to produce the timeshifted delivery to the recipient, wherein the time delay corresponds to at least a relative time difference within a workday between the sender and the recipient;
withhold transfer the message for delivery to the recipient in accordance with the time delay.

20. The computing apparatus of claim 19, comprising further program instructions, when executed by the processing system, direct the processing system to at least:
determine the time delay to produce the timeshifted delivery by at least determining a first time zone associated with the sender and a second time zone associated with the recipient and establishing the time delay based at least on a time differential between the first time zone and the second time zone.

* * * * *